(12) United States Patent
Li et al.

(10) Patent No.: US 8,995,021 B2
(45) Date of Patent: Mar. 31, 2015

(54) BLACK TRAPPING METHODS, APPARATUS AND SYSTEMS FOR BINARY IMAGES

(71) Applicant: Xerox Corporation, Norwalk, CT (US)

(72) Inventors: Xing Li, Webster, NY (US); Zhenhuan Wen, Pittsford, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 13/916,059

(22) Filed: Jun. 12, 2013

(65) Prior Publication Data

US 2014/0368886 A1 Dec. 18, 2014

(51) Int. Cl.
G06F 3/12 (2006.01)
G06K 15/02 (2006.01)

(52) U.S. Cl.
CPC .................. G06K 15/1881 (2013.01)
USPC ............. 358/3.06; 358/1.9; 358/2.1; 382/162

(58) Field of Classification Search
USPC ................... 358/1.9, 2.1, 3.06; 345/596, 615; 347/15, 43; 382/162, 266; 600/441
See application file for complete search history.

(56) References Cited

U.S. PATENT DOCUMENTS

| | | | |
|---|---|---|---|
| 5,635,967 A * | 6/1997 | Klassen .......................... | 347/43 |
| 5,784,172 A | 7/1998 | Coleman | |
| 5,800,356 A * | 9/1998 | Criton et al. .................. | 600/441 |
| 5,923,821 A | 7/1999 | Birnbaum et al. | |
| 5,960,163 A | 9/1999 | Nickell et al. | |
| 6,232,953 B1 * | 5/2001 | Graham et al. ............... | 345/596 |
| 6,236,754 B1 | 5/2001 | Harrington | |
| 6,353,687 B1 | 3/2002 | Schweid | |
| 6,628,842 B1 * | 9/2003 | Nagao .......................... | 382/266 |
| 7,009,735 B2 | 3/2006 | Ebner | |
| 7,048,349 B2 | 5/2006 | Yao et al. | |
| 7,246,880 B2 | 7/2007 | Ross et al. | |
| 7,271,934 B2 | 9/2007 | McElvain | |
| 7,684,087 B2 | 3/2010 | Yao | |
| 8,077,353 B2 | 12/2011 | Wada | |
| 8,437,045 B2 | 5/2013 | Yao et al. | |
| 2003/0179409 A1 * | 9/2003 | Nishida ......................... | 358/2.1 |
| 2007/0236740 A1 * | 10/2007 | Yao .............................. | 358/3.06 |
| 2010/0277770 A1 * | 11/2010 | Yao .............................. | 358/3.06 |
| 2011/0051197 A1 * | 3/2011 | Yao et al. ..................... | 358/3.06 |
| 2011/0243429 A1 * | 10/2011 | Yao .............................. | 382/162 |

OTHER PUBLICATIONS

Jacci Howard Bear, "Trapping", from Jacci Howard Bear's Desktop Publishing Glossary; About.com desktop publishing, htts://desktop-pub.about.com/cs/basic/g/trapping.htm, 1 page, dated Jan. 16, 2013.
Brian P. Lawler, "Electronic trapping: computer-controlled register control", 1995-1998, v.7—Oct. 2, 1998, 4 pages.

* cited by examiner

*Primary Examiner* — David S Cammack
(74) *Attorney, Agent, or Firm* — Fay Sharpe LLP (57) ABSTRACT

Provided are black trapping methods, apparatus and systems for binary images. According to one exemplary method, black trapping color image data is performed by incorporating a set of trapping condition logical operations. Specifically, edge checking is based on estimated contone color values and density checking based on a binary bitmap.

20 Claims, 10 Drawing Sheets

| K00 | K01 | K02 | K03 | K04 |
|-----|-----|-----|-----|-----|
| K10 | K11 | K12 | K13 | K14 |
| K20 | K21 | x   | K23 | K24 |
| K30 | K31 | K32 | K33 | K34 |
| K40 | K41 | K42 | K43 | K44 |

BLACK TRAPPING METHODS, APPARATUS AND SYSTEMS FOR BINARY IMAGES

CROSS REFERENCE TO RELATED PATENTS AND APPLICATIONS

U.S. Pat. No. 7,684,087, by Yao, issued Mar. 23, 2010 and entitled "BITMAPPED BASED TRAPPING" and U.S. Pat. No. 8,437,045, by Yao et al., issued May 7, 2013 and entitled "BITMAPPED BASED TRAPPING METHODS, APPARATUS AND SYSTEM BY MODIFYING NON-BLACK HALFTONE PIXEL BITMAP PLANE USING ESTIMATED CONTINUOUS TONE VALUE" are incorporated herein by reference in their entirety.

BACKGROUND

The subject disclosure is generally directed to trapping on color printers.

Raster type printers, which have been implemented with various print engines such as electrostatographic print engines and ink jet print engines, commonly employ halftoning to transform continuous tone image data to print data that can be printed as an array of dots that can be of substantially similar size. For example, 8 bit per pixel per primary continuous tone image data can be halftoned to 4-bit or one-bit data per pixel per primary color. A frequently encountered problem in color printing is misregistration of the color planes, which can cause objectionable artifacts. For example, when black text is printed on a color background, misregistration of black relative to the other colors can cause a white gap between the black text and the color background. Other kinds of print engine problems, such as trailing edge deletion, where toner at the trailing edge fails to transfer, can cause similar artifacts. Trapping can be used to compensate for these problems by overlapping the colors near the edge so that there is no white gap when misregistration or trailing edge deletion happens. For example, the background color can be added to the black pixels near the black text edge.

U.S. Pat. No. 7,684,087 discloses a bitmap-based approach to perform black trapping. For each black pixel qualified for trapping, an algorithm evaluates pixels in each color plane that are found using the corresponding halftone screen vectors. If these pixel locations contain color, the corresponding color is added to the black pixel location. This allows the color halftone dots to extend beyond the black edges, thus eliminating white gaps according to an exemplary embodiment. Notable, the '087 patent does not control the depth of trapping and requires a relatively large number of scan lines to find neighboring cells using halftone screen vectors.

U.S. Pat. No. 8,437,045 discloses another bitmap-based approach to perform black trapping. Black trapping color image data is performed by estimating the continuous tone values associated with non-black pixels near a qualified black pixel and subsequently, the estimated continuous tone values are halftoned at the qualified black pixel locations and ORed with the original bitmap.

INCORPORATION BY REFERENCE

"Trapping", 1 page, dated Jan. 16, 2013, from Jacci Howard Bear's Desktop Publishing Glossary; About.com desktop publishing, https://desktoppub.about.com/cs/basic/g/trapping.htm;

"Electronic trapping: computer-controlled register control", by Brian P. Lawler, 1995-1998, v.7—Oct. 2, 1998, 4 pages;

U.S. Pat. No. 5,784,172, by Coleman, issued Jul. 21, 1998 and entitled "AUTOMATIC ALGORITHMIC DETERMINATION OF PROCESS BLACK OVER A COLOR FIELD";

U.S. Pat. No. 5,923,821, by Birnbaum et al., issued Jul. 13, 1999 and entitled "DIGITAL IMAGE TRAPPING SYSTEM";

U.S. Pat. No. 5,960,163, by Nickell et al., issued Sep. 28, 1999 and entitled "COLOR BITMAP MERGING OF BLACK OBJECTS USING PARTIALLY CORRELATED SEPARATION MAXIMUM VALUE CLIPPING";

U.S. Pat. No. 6,236,754, by Harrington, issued May 22, 2001 and entitled "IMAGE MODIFICATION TO REDUCE SUSCEPTIBILITY TO MISREGISTRATION";

U.S. Pat. No. 6,353,687, by Schweid, issued Mar. 5, 2002 and entitled "SYSTEM AND APPARATUS FOR SINGLE SUBPIXEL ELIMINATION WITH LOCAL ERROR COMPENSATION IN AN HIGH ADDRESSABLE ERROR DIFFUSION PROCESS";

U.S. Pat. No. 7,009,735, by Ebner, issued Mar. 7, 2006 and entitled "METHOD FOR BLACK TRAPPING AND UNDER PRINT PROCESSING";

U.S. Pat. No. 7,048,349, by Yao et al., Issued May 23, 2006 and entitled "COLOR PRINTING";

U.S. Pat. No. 7,246,880, by Ross et al., issued Jul. 24, 2007 and entitled "METHOD FOR BLACK PIXEL DESIGNATION IN DOCUMENT IMAGE DATA";

U.S. Pat. No. 7,271,934, by McElvain, issued Sep. 18, 2007 and entitled "METHOD FOR SMOOTH TRAP SUPPRESSION OF SMALL GRAPHICAL OBJECTS USING RUN LENGTH ENCODED DATA";

U.S. Pat. No. 7,684,087, by Yao, Issued Mar. 23, 2010 and entitled "BITMAPPED BASED TRAPPING"; and U.S. Pat. No. 8,077,353, by Wada, issued Dec. 13, 2011 and entitled "COLOR CONVERSION METHOD, COLOR CONVERSION TABLE CREATED BY THE COLOR CONVERSION METHOD, IMAGE PROCESSING APPARATUS, AND COLOR CONVERSION PROGRAM"; are all incorporated herein by reference in their entirety.

BRIEF DESCRIPTION

In one embodiment of this disclosure, described is a method of performing black trapping on a color image data representation for rendering comprising: a) determining if the pixel of interest is a natural extension of a halftone pattern associated with the halftone bitmap; b) estimating a continuous tone value associated with black pixels within a predetermined window of pixels associated with the pixel of interest; c) determining if the pixel of interest is associated with an edge based on the continuous tone values associated with black pixels estimated in step b); and d) if the pixel of interest is a natural extension of a halftone pattern associated with the halftone bitmap and the pixel of interest is associated with an edge, modifying a non-black halftone pixel bitmap plane at the pixel of interest location.

In another embodiment of this disclosure, described is a printing apparatus comprising: an image marking device for rendering a color image on a media substrate; and a controller configured to receive a halftone pixel bitmap representation of an image for rendering on the image marking device, the controller configured to execute instructions to perform a method of black trapping, the method comprising: receiving a halftone pixel bitmap representing the color image, the halftone pixel bitmap including a black pixel bitmap plane and one or more non-black halftone pixel bitmap planes; a) determining if the pixel of interest is a natural extension of a halftone pattern associated with the halftone bitmap; b) estimating a continuous tone value associated with black pixels within a predetermined window of pixels associated with the pixel of interest; c) determining if the pixel of interest is associated with an edge based on the continuous tone values associated with black pixels estimated in step b); and d) if the pixel of interest is a natural extension of a halftone pattern associated with the halftone bitmap and the pixel of interest is associated with an edge, modifying a non-black halftone pixel bitmap plane at the pixel of interest location.

In still another embodiment of this disclosure, described is a method of performing black trapping on a color image data representation for rendering comprising: receiving a halftone pixel bitmap representing the color image, the halftone pixel bitmap including a black pixel bitmap plane and colorant halftone pixel bitmap planes; selecting a pixel of interest associated with the halftone pixel bitmap a) determining if the pixel of interest is a natural extension of a halftone pattern associated with the halftone bitmap; b) determining if the pixel of interest is associated with an edge; c) determining if the density of black pixels substantially near the pixel of interest is greater than a predetermined threshold; and d) if the pixel of interest is a natural extension of a halftone pattern associated with the halftone bitmap, a pixel of interest is associated with an edge and the density of black pixels is greater than the predetermined threshold, modifying a non-black halftone pixel bitmap plane at the pixel of interest location.

In yet another embodiment of this disclosure, described is a printing apparatus comprising: an image marking device for rendering a color image on a media substrate; and a controller configured to receive a halftone representation of an image for rendering on the image marking device, the controller configured to execute instructions to perform a method of black trapping on the halftone representation of the image, the method comprising: receiving a halftone pixel bitmap representing the color image, the halftone pixel bitmap including a black pixel bitmap plane and colorant halftone pixel bitmap planes; selecting a pixel of interest associated with the halftone pixel bitmap a) determining if the pixel of interest is a natural extension of a halftone pattern associated with the halftone bitmap; b) determining if the pixel of interest is associated with an edge; c) determining if the density of black pixels substantially near the pixel of interest is greater than a predetermined threshold; and d) if the pixel of interest is a natural extension of a halftone pattern associated with the halftone bitmap, a pixel of interest is associated with an edge and the density of black pixels is greater than the predetermined threshold, modifying a non-black halftone pixel bitmap plane at the pixel of interest location.

DETAILED DESCRIPTION

This disclosure and the exemplary embodiments provided herein provide a solution for binary black trapping. It incorporates a set of simple trapping condition checking logics into a black trapping algorithm. Specifically, an edge checking algorithm based on estimated contone color values and a density checking algorithm based on a binary bitmap of a black plane are provided to improve the robustness of binary black trapping. Benefits include delivery of high image quality for market segments such as the graphic arts industry in a cost effective manner.

The term "data" refers herein to physical signals that indicate or include information. An "image", as a pattern of physical light or a collection of data representing said physical light, may include characters, words, and text as well as other features such as graphics. A "digital image" is by extension an image represented by a collection of digital data. An image may be divided into "segments", each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel", which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. Although described herein as continuous tone processing, the present invention applies equally as well to the processing of color images, wherein each separation is treated, effectively, as a gray scale or continuous tone image. Accordingly, references herein to the processing of continuous tone (contone) or gray scale images is intended to include the processing of color image separations as well. An operation performs "image processing" when it operates on an item of data that relates to part of an image.

Digital "halftoning" refers to encoding methods that are used to reduce the number of quantization levels per pixel in a digital image, while maintaining the gray appearance of the image at normal viewing distance. Halftoning is widely employed in the printing and display of digital images. The need for halftoning encoding arises either because the physical processes involved are binary in nature or the processes have been restricted to binary operation for reasons of cost, speed, memory or stability in the presence of process fluctuations. Examples of such processes are most printing presses, ink jet printers, binary cathode ray tube (CRT) displays, and laser xerography. In most printing and display applications, the halftoned image is composed ideally of two gray levels, black and white. Spatial integration, plus higher level processing performed by the human visual system, of local area coverage of black and white pixels, provides the appearance of a gray level, or "continuous tone," image. Many halftone techniques readily extend to color and to quantization using more than two levels.

As previously discussed in the Background, U.S. Pat. No. 7,684,087, by Yao, Issued Mar. 23, 2010, provides a binary black trapping method which extends color halftone patterns under black on color-black edges. U.S. Pat. No. 8,437,045, by Yao et al., provides a black trapping method that determines trapping pixels by halftoning the contone color value estimated from the appropriate color binary bitmap.

This disclosure provides a complete solution for binary black trapping, including a mechanism to determine the area in which to apply black trapping. It incorporates a set of simple trapping condition checking logics into the trapping algorithm. Specifically, an edge checking algorithm based on estimated contone color value and a density checking based on the binary bitmap of the black plane are added to improve the robustness of binary black trapping.

The present disclosure provides bitmap based black trapping methods, apparatus and systems. According to an exemplary embodiment, halftoned image data is received as an input, an algorithm identifies black pixels qualified for black trapping, the algorithm estimates the black pixel continuous-tone values for an area around a qualified black pixel, the algorithm determines black pixel density near the qualified black pixel, and then the algorithm decides if C, M and Y pixels at the qualified black pixel locations should be turned on using the estimated continuous-tone values and the black pixel density determination.

Another feature of the disclosed black trapping methods, apparatus and systems is the ability to control the depth of trapping. Stated another way, the algorithms executed check if a non-black pixel is within a predetermined neighborhood around a selected black pixel. The size of the neighborhood, i.e. 1×1, 2×2, 3×3, etc., provides the depth of trapping as will be further explained below.

With reference to FIGS. 1-4, a detailed description of a printing system, an associated pixel array and black edge on a halftoned cyan background, and halftone screen vectors is provided to further describe an exemplary embodiment of the disclosed printing system and illustrate the applicability of the disclosed algorithm to black edges.

Figure 1:
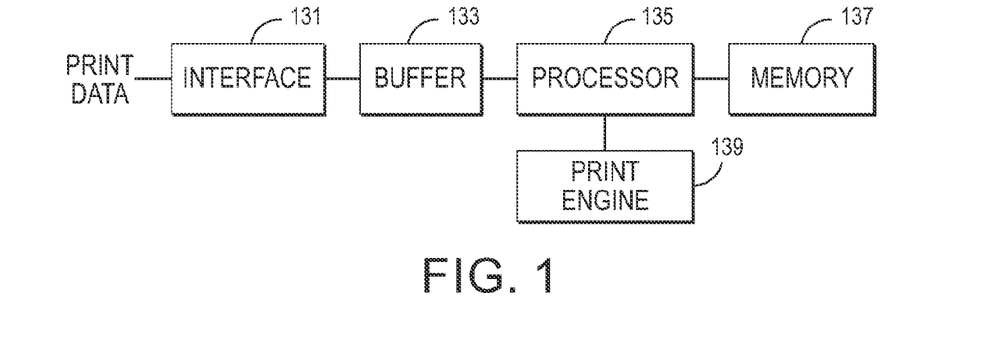
FIG. 1 is a schematic block diagram of an embodiment of a printing system.

FIG. 1 is a schematic block diagram of an embodiment of a printing apparatus that includes an interface 131 that receives print data, for example from a host computer, and stores the print data in a buffer memory 133. A processor 135 is configured to process the print data to produce bit mapped raster data that is stored in a memory 137. A print engine 139 prints an image pursuant to the bit mapped raster data generated by the processor 135. The print engine 139 can be an electrostatographic print engine or an ink jet print engine, for example.

Printing is accomplished by selectively printing, depositing, applying or otherwise forming markings such as dots on a receiver surface or substrate that can be a print output medium such as paper or a transfer surface such as a transfer belt or drum. If a transfer surface is used, the image formed or printed on the transfer surface is appropriately transferred to a print output medium such as paper.

Figure 2:
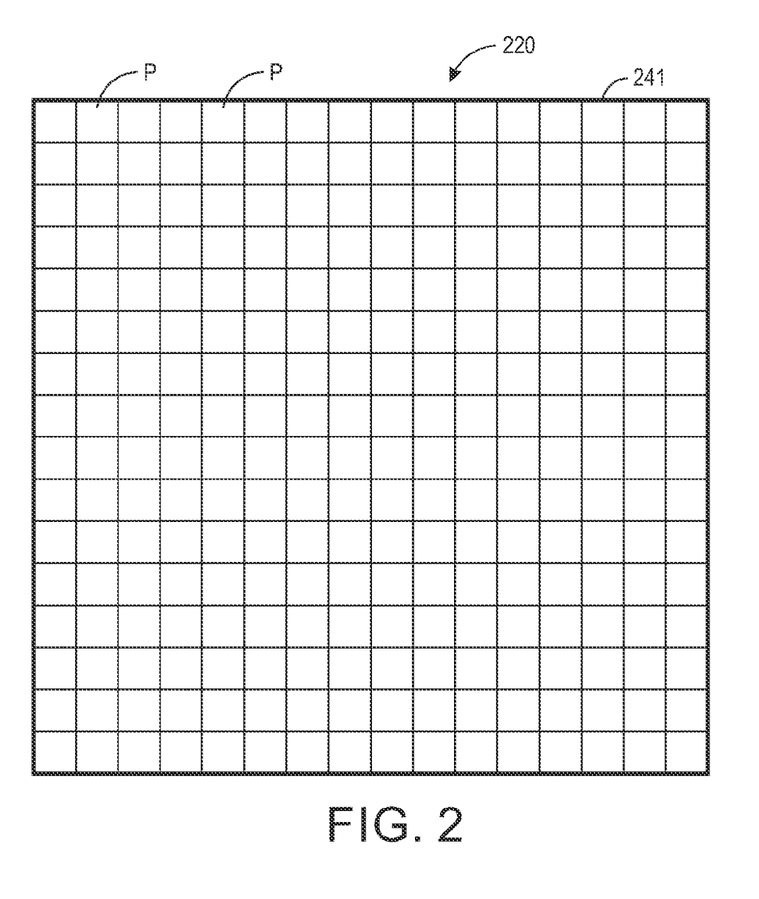
FIG. 2 is a schematic illustration of an embodiment of a pixel array.

FIG. 2 is a schematic illustration of an embodiment of an array 220 of pixel locations P that can be used to define the locations on a print output medium 241 that can be marked or printed. A marking of a particular primary color (e.g., cyan, magenta, yellow or black) that is printed or deposited at a pixel location can be conveniently called a dot.

Each pixel location P can, for example, be marked or printed with (a) one or more non-black primary color dots (e.g., cyan, magenta or yellow), (b) a black dot by itself, or (c) a black dot and at least one non-black primary color dot.

Print data typically comprises continuous tone data, such as 32-bit or 24-bit pixel data, and halftoning using one or more halftone threshold arrays, for example, is commonly employed to map or transform continuous tone data to halftoned data that describes the primary color or colors, if any, that is/are to be printed at the corresponding output pixel location P. For example, the halftoned data can comprise one bit data per pixel per primary color or multi-bit data per pixel per primary color, wherein the multi-bit data contains fewer bits than the continuous tone data, for example eight or four bits.

Pursuant to half-toning, the array 220 more particularly comprises an array or collection of identically shaped halftone cells for each primary color, wherein the halftone cell configuration for each primary color can be different. Thus, each pixel P can have a different intra-cell location or position in the respective halftone cells for the different primary colors. A halftone cell includes a relatively small number of pixels, and each of the halftone cells for a primary color can have the same fill order. For convenience, pixels having the same intra-cell position or location in a particular primary color halftone cell array can be referred to as pixels that are correspondingly located in halftone cells for a primary color.

Figure 3:
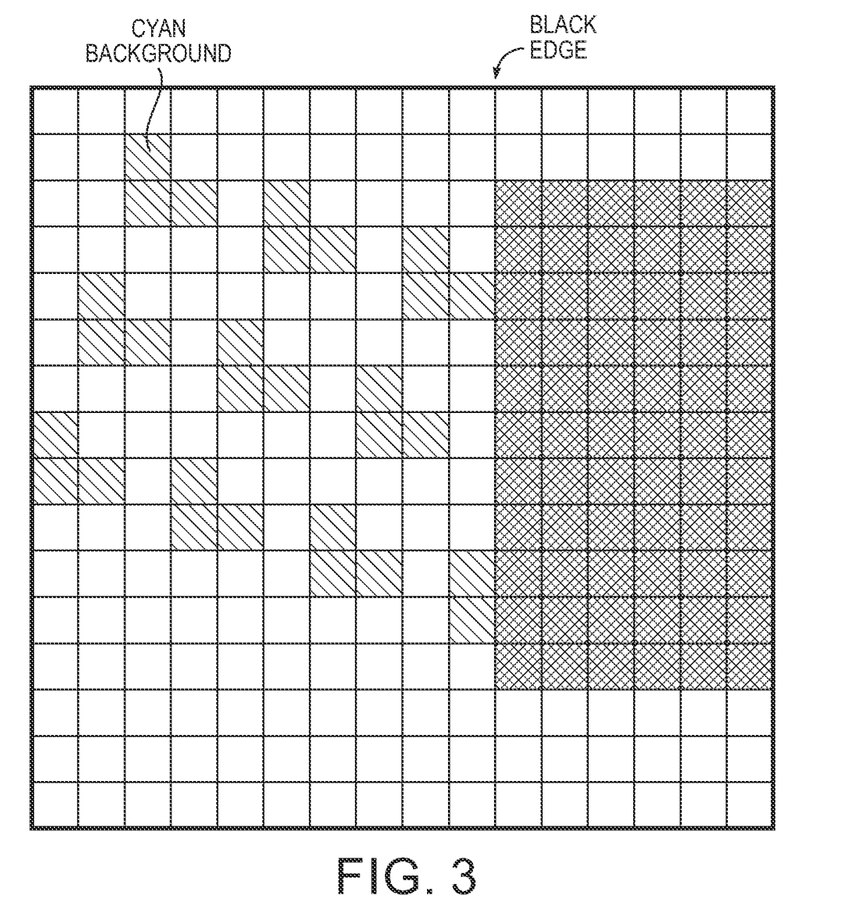
FIG. 3 is a schematic illustration of a black edge on a halftoned cyan background.

FIG. 3 shows a black edge on a halftoned cyan background. When there is misregistration between the cyan and black color planes, a white gap can appear between the cyan halftone dots and the black edge.

Figure 4:
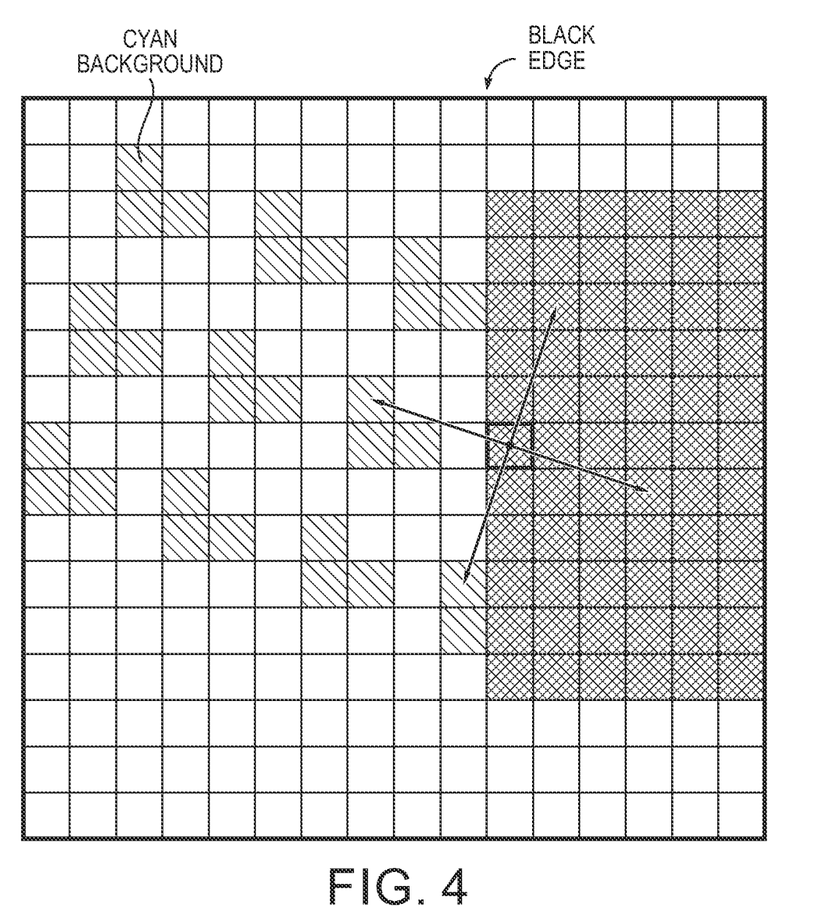
FIG. 4 is a schematic illustration of halftone screen vectors.

FIG. 4 shows illustrative examples of cyan screen vectors originating from a selected pixel that is on the black edge. Screen vectors can be used to locate correspondingly located pixels in neighboring cyan halftone cells.

Described heretofore is an algorithm for performing bitmap based black trapping according to the exemplary embodiments of this disclosure. It is to be understood the algorithm described can be executed by a printing apparatus and systems to perform methods of black trapping consistent with the disclosed algorithm.

Figure 5:
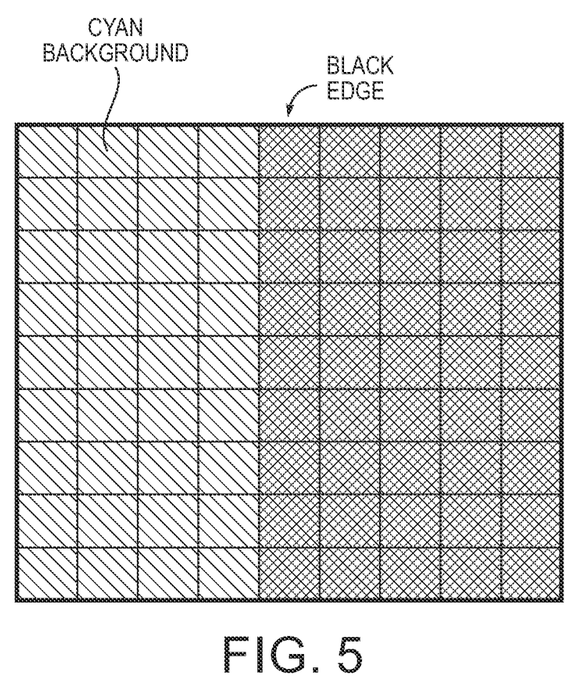
FIG. 5 is a schematic illustration of a black edge on a halftoned screen.

According to one process associated with the algorithm, the black continuous-tone color values are estimated around the pixel of interest to determine if the pixel of interest is associated with an edge as will be explained in more detail below. Notably, counting the number of black pixels in the area is not a preferred manner to estimate the color values because the area likely includes an edge. For example, in FIG. 5, which includes a solid cyan-black edge, black should have a continuous-tone value of 255, but counting black pixels in the area gives an estimate that is too low. In contrast, the disclosed algorithm uses the halftone screens that generated the halftoned bitmaps to estimate the black continuous-tone color values.

The window used for black channel estimation is centered on the pixel of interest in consideration, and should be large enough to cover a halftone cell. For example, a 7×7 window may be used for 600×600 dpi. The window does not have to be square, i.e., the height of the window can be reduced to use fewer raster lines and the width of the window can be increased to make it more hardware friendly.

Figure 6:
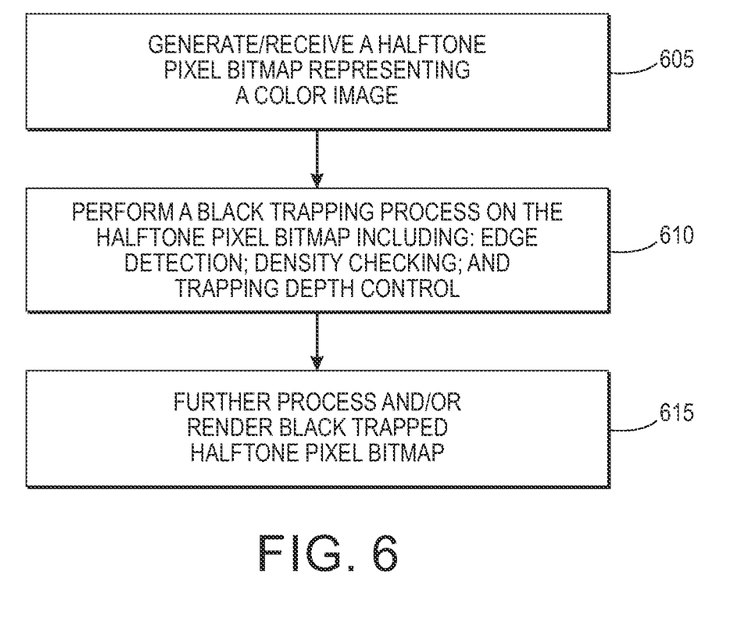
FIG. 6 is a schematic flow diagram of an exemplary embodiment of an image rendering process including a black trapping process according to this disclosure.

With reference to FIG. 6, illustrated is a flow diagram of an exemplary embodiment of an image rendering process including a black trapping process according to this disclosure.

Initially 605, the process generates/receives a halftone pixel bitmap representing a color image.

Next, 610, the process performs a black trapping process on the halftone pixel bitmap including: edge detection; density checking; and trapping depth control.

Finally 615, the black trapped halftone pixel bitmap is either further processed, prior to rendering, or rendered on an image output device, such as a xerographic printer or ink type printer.

Figure 7:
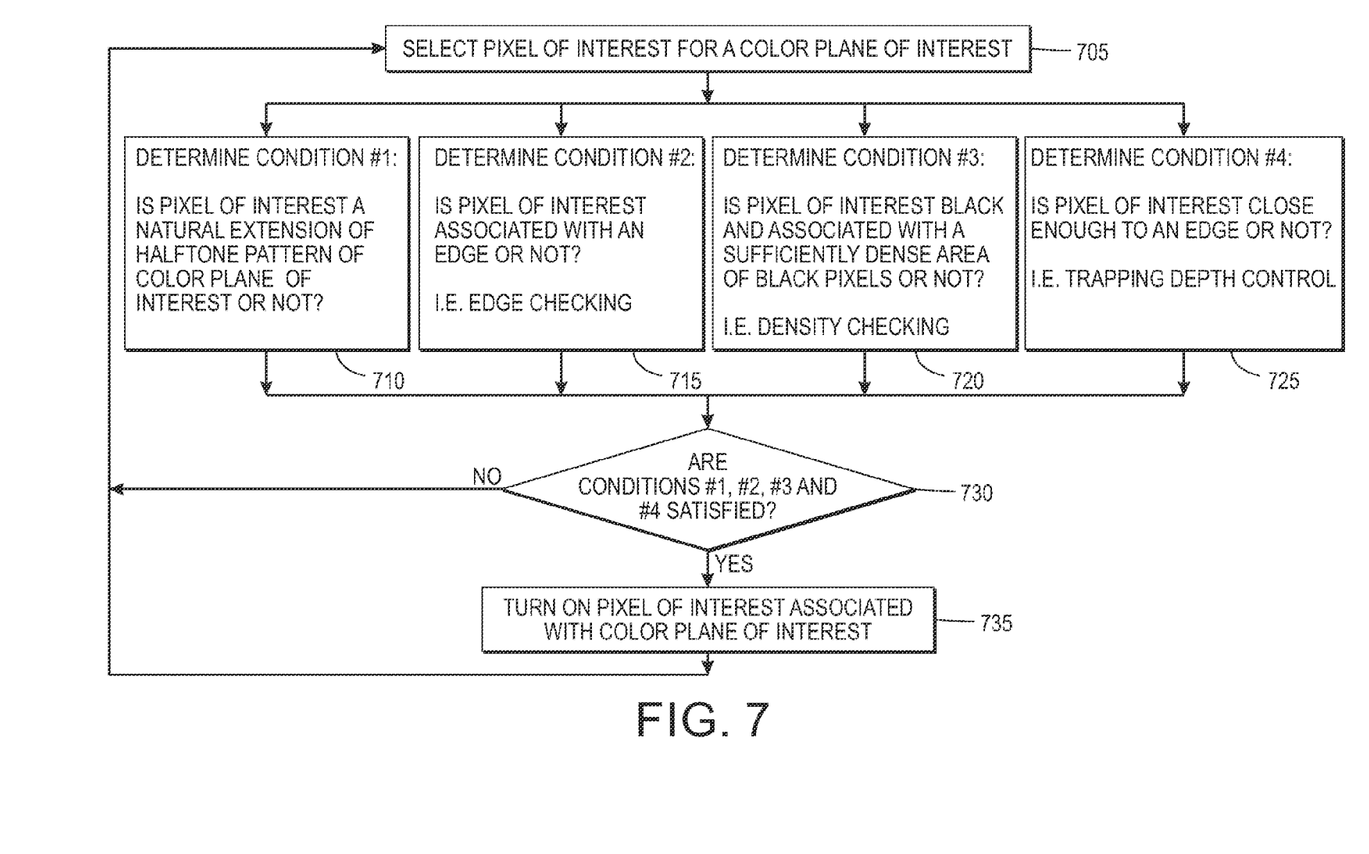
FIG. 7 is a schematic flow diagram of an exemplary embodiment of a procedure for modifying halftoned data for a selected pixel.

FIG. 7 illustrates a more detailed flow chart of the black trapping process disclosed, including the determination of a plurality of conditions associated with the pixel of interest, i.e. condition 1 710, condition 2 715, condition 3 720, and condition 4 725. These condition checks provide the basis for the black trapping process to determine whether or not to turn on a pixel of a particular color plane at the pixel of interest, thereby trapping the pixel.

Initially, at 705, a pixel of interest is selected for a color plane of interest.

Next, the following condition checks are performed in parallel.

At 710, the process determines condition 1: Is pixel of interest a natural extension of the halftone pattern of the color plane of interest or not?

At 715, the process determines condition 2: Is the pixel of interest associated with an edge or not? i.e. edge checking.

At 720, the process determines condition 3: Is the pixel of interest black and associated with a sufficiently dense area of black pixels or not? i.e. density checking.

At 725, the process determines condition 4: Is the pixel of interest close enough to an edge or not? i.e. trapping depth control.

At 730, if any one of the conditions 1-4 is negative, trapping is not performed on the pixel of interest. If, however, at 735, all conditions 1-4 are affirmative, the pixel associated with the color plane of interest is turned on at the location of the pixel of interest, i.e. trapping is performed.

As indicated in FIG. 7, the black trapping process is performed until all pixels associated with the halftone bitmap are processed as pixels of interest.

The following is an exemplary implementation of the method provided.

Note that the data such as context window size are example values and could vary depending on different factors.

The context used for binary black trapping is 21×21.

Condition 1: Condition for Color Channels (C, M and Y).

Figure 8:
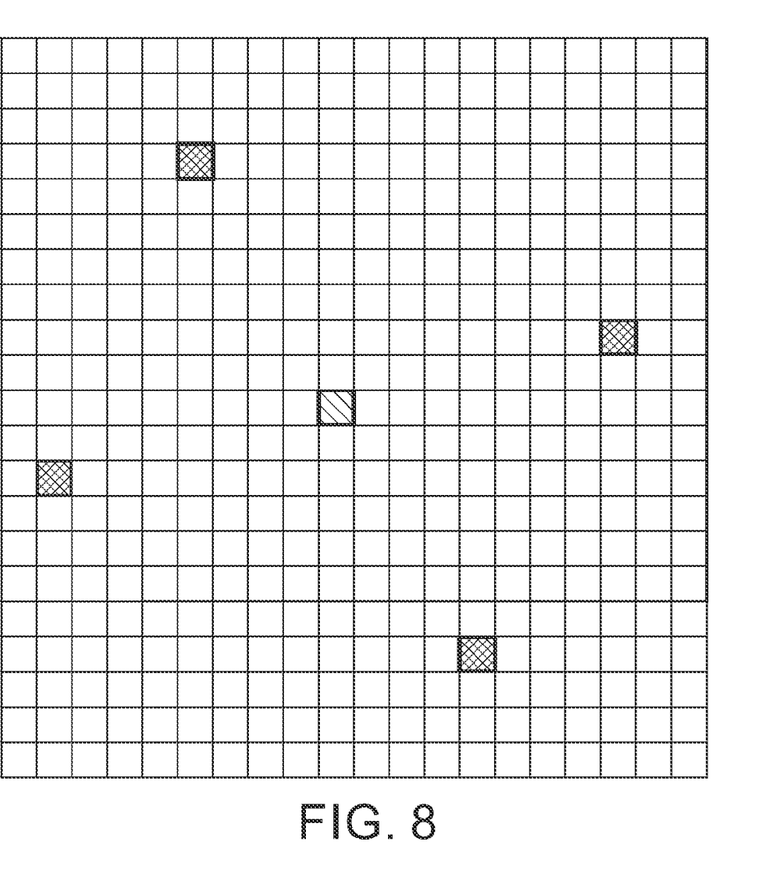
FIG. 8 is an illustration of color pixel checking according to an exemplary embodiment of this disclosure.

Using the C plane as an example, the condition is satisfied if at least one of the following is true The pixel is on at the location (xCurr+hzC1, yCurr+vtC1)
The pixel is on at the location (xCurr−hzC1, yCurr−vtC1)
The pixel is on at the location (xCurr−hzC2, yCurr+vtC2)
The pixel is on at the location (xCurr+hzC2, yCurr−vtC2)
(xCurr, yCurr) is the location of the pixel of interest
hzC1, vtC1, hzC2 and vtC2 are programmable registers
FIG. 8 shows an example of the four locations to check
Note that we will fetch data from four lines out of the 21 lines buffered. In other words, we don't need to move the entire context window into a register array.

Figure 9:
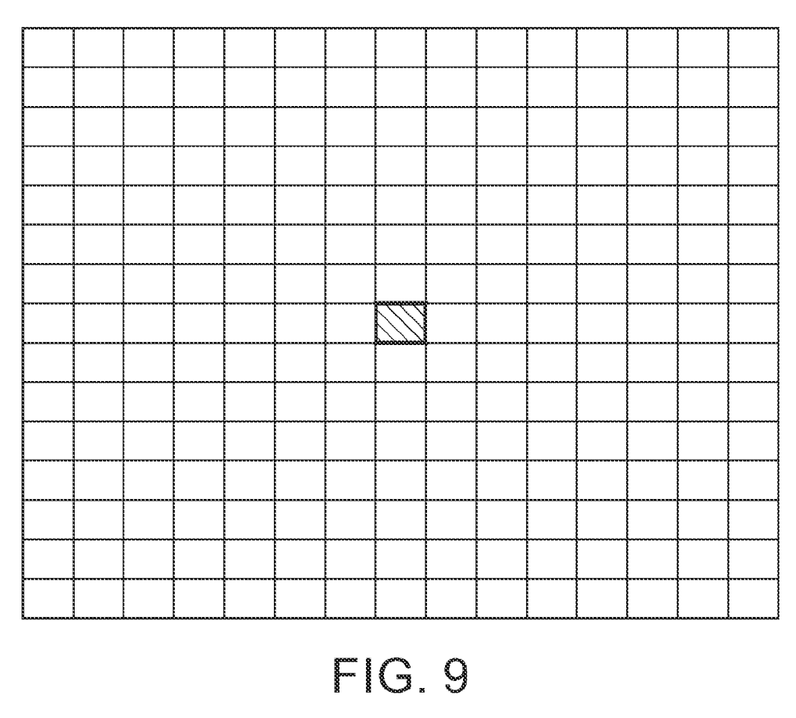
FIG. 9 is an illustration of a context window for a K (Black) channel according to an exemplary embodiment of this disclosure.

The context for K channel conditions checking is 15×15 centered around the current pixel of interest, see FIG. 9, which is relevant to condition 2, 3 and 4, described below.

Figure 10:
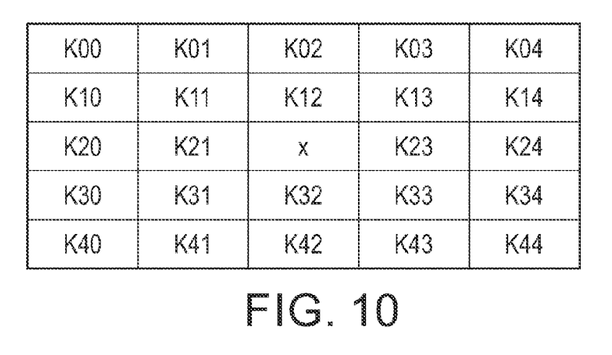
FIG. 10 illustrates pixel labeling for the K plane 5×5 binary context window according to an exemplary embodiment of this disclosure.

Condition 2: Estimated Contone Level Checking.
The 5×5 matrix of the K channel color estimate result is used
  The color estimate method is described in U.S. Patent Application Publication No. US 2011/0051197, by Yao et al.
Use highCount 3×3 to record the number of estimates in the center 3×3 (out of the 5×5 estimate matrix) that are no less than high 3×3 Thresh
Use highCount to record the number of estimates in the 5×5 matrix that are no less than highThresh
Use lowCount to record the number of estimates in the 5×5 matrix that are no greater than lowThresh
The contone level checking condition is satisfied if all the following conditions are satisfied:
high3×3Count>=high3×3CountThresh
high Count>=high Count Thresh
lowCount>=lowCountThresh
highCount+lowCount>=twoCountThresh Condition 3: Thickness Checking.
This is to ensure that we have enough ON pixels around the current pixel of interest
The current pixel of interest is on
Any one of the following conditions are satisfied (pixel labeling shown in FIG. 10)
  (K23 & K24)==1&&((K13 & K14)==1||(K33 & K34)==1))
  (K20 & K21)==1&&((K10 & K11)==1||(K30 & K31)==1))
  (K32 & K42)==1&&((K31 & K41)==1||(K33 & K43)==1))
  (K02 & K12)==1&&((K01 & K11)==1||(K03 & K13)==1))
  (K21 & K30 & K31 & K32 & K40 & K41)==1
  (K23 & K32 & K33 & K34 & K43 & K44)==1
  (K00 & K01 & K10 & K11 & K12 & K21)==1
  (K03 & K04 & K12 & K13 & K14 & K23)==1

Figure 11:
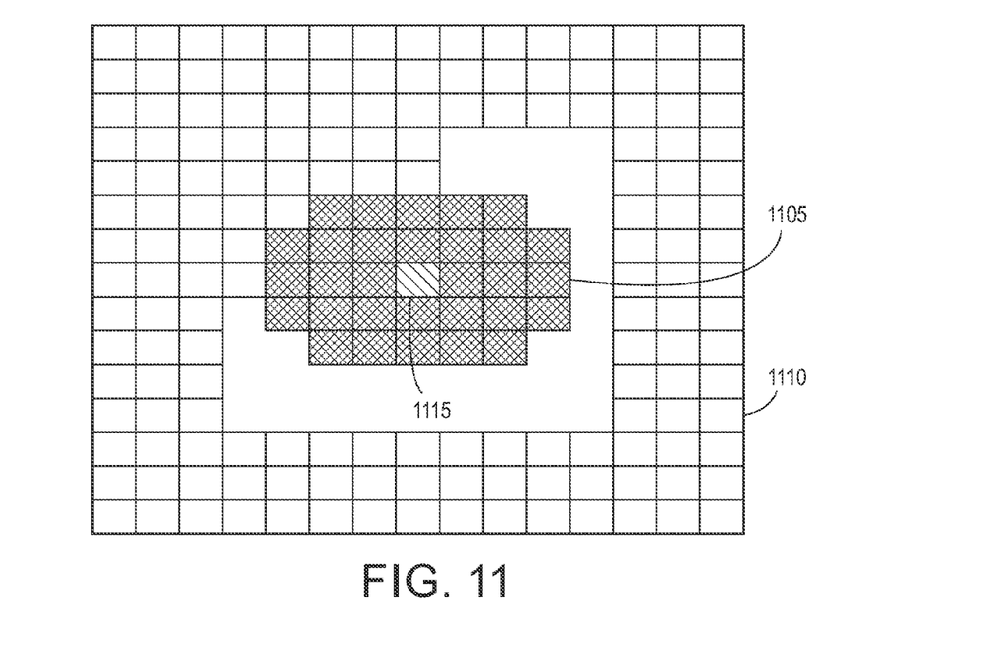
FIG. 11 illustrates one example of a neighborhood associated with a white pixel according to an exemplary embodiment of this disclosure.

Condition 4: Off Neighbor Checking.
This is for trapping depth control.
There is at least one OFF pixel in the neighborhood of the current binary pixel of interest. The neighborhood is confined in the 9×9 window centered on the current pixel of interest and is defined by array4OffCheck, which contains five 5-bit elements that specify one quadrant of a programmable and symmetrical shape. FIG. 11 shows an example of distance check region.
Note that with the checking area specified above we can allow trapping depths of two 600 dpi equivalent pixels with 1200×1200 dpi input.

Final Decision.
The pixels of interest in a color plane will be turned on (trapping applied) at the current pixel of interest if all the conditions are met:
  The color channel condition 1.
  The K channel "contone level checking" condition 2.
  The K channel "thickness" condition 3.
  The K channel "off neighbor" condition 4.

Table 1 lists the programmable registers used in the binary black trapping module.

TABLE 1

List of programmable registers

| Name | Format | Note |
|---|---|---|
| hzC1 | U5.0 | |
| vtC1 | U5.0 | |

TABLE 1-continued

List of programmable registers

| Name | Format | Note |
|---|---|---|
| hzC2 | U5.0 | |
| vtC2 | U5.0 | |
| hzM1 | U5.0 | |
| vtM1 | U5.0 | |
| hzM2 | U5.0 | |
| vtM2 | U5.0 | |
| hzY1 | U5.0 | |
| vtY1 | U5.0 | |
| hzY2 | U5.0 | |
| vtY2 | U5.0 | |
| high3x3Thresh | U4.0 | |
| highThresh | U4.0 | |
| lowThresh | U4.0 | |
| high3x3CountThresh | U4.0 | |
| highCountThresh | U5.0 | |
| lowCountThresh | U5.0 | |
| twoCountThresh | U5.0 | |
| array4OffCheck | U5.0 | 5-element array |

The method for estimating color from binary data can be found in U.S. Patent Application Publication No. US 2011/0051197, by Yao et al. The following details are provided, in part, from that published patent application, as additional background.

Assuming that the continuous-tone value of cyan is Ci in an area. Halftoning would have been done as follows:

If Ci > t, cyan is on
If Ci <= t, cyan is off

What this means is that Ci is greater than any halftone threshold that corresponds to a cyan pixel that is on in the area, and Ci is less than or equal to any halftone threshold that corresponds to a cyan pixel that is off in the area. Therefore, we can find all the pixels with cyan on, and obtain the maximum value of the thresholds that correspond to these cyan pixels, Tc1, and Ci>Tc1.

The K channel 5×5 and 3×3 color estimate matrix could be a sliding window, or a tiling window, or a hybrid window as described in U.S. Pat. No. 7,684,087, by Yao, Issued Mar. 23, 2010. The pixel of interest is within the center window.

Note that in U.S. Pat. No. 7,684,087, by Yao, Issued Mar. 23, 2010 there is no use of contone estimate. In U.S. Patent Application Publication No. 2011/0051197, by Yao et al., published Mar. 3, 2011 contone estimate is used to estimate the location of the extended halftone dots.

Figure 12:
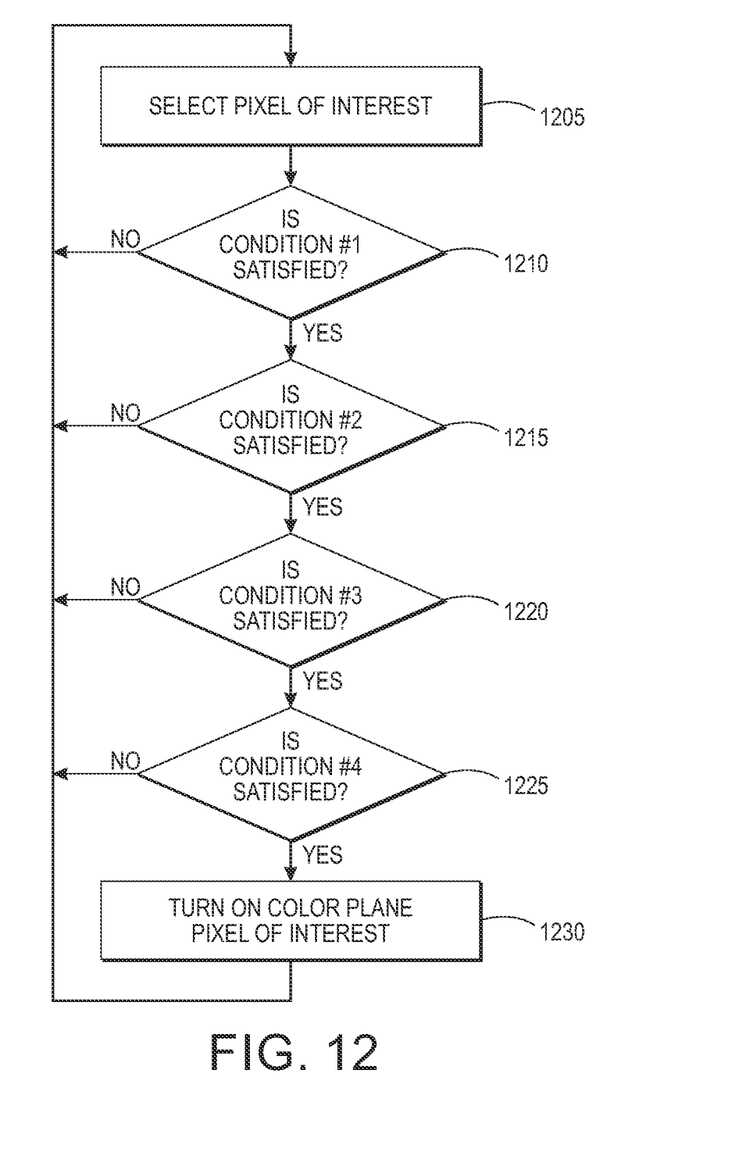
FIG. 12 is a schematic flow diagram of an exemplary embodiment of a procedure for modifying halftoned data for a selected pixel.

FIG. 12 is a schematic flow diagram of another exemplary embodiment of a procedure/process for modifying halftone data for a selected pixel, as disclosed herein.

In contrast to the black trapping process of FIG. 7, which is a parallel processing embodiment, FIG. 12 illustrates a serial processing approach for determining conditions 1-4.

Initially, at 1205 a pixel of interest is selected.

Next, at 1210, the process determines if condition 1 is satisfied. If condition 1 is not satisfied, the process does not perform black trapping on the pixel of interest and selects another pixel of interest at 1205. If, however, the process determines condition 1 is satisfied, then the process advances to 1215, to determine if condition 2 is satisfied.

This same process pattern is repeated for determining condition 3 at 1220 and condition 4 at 1225.

Finally, at 1230, if condition 4 is satisfied, the process turns on the pixel of the color plane of interest at the pixel of interest location, and the process selects another pixel of interest at 1205.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of performing black trapping on a color image data representation, the color image representation including a black pixel bitmap and one or more non-black halftone pixel bitmaps for rendering comprising:
    a) determining if a black pixel of interest location associated with the black pixel bitmap is a pixel location associated with a natural extension of a halftone pattern associated with a non-black halftone pixel bitmap;
    b) estimating a continuous tone value associated with one or more black pixels within a predetermined window of pixels associated with the black pixel of interest location;
    c) determining if the black pixel of interest location is associated with an edge based on the continuous tone values associated with the one or more black pixels estimated in step b);
    d) determining an on/off state of black pixels within a 5×5 pixel area centered on the black pixel of interest;
    e) evaluating a plurality of logical expressions associated with the determined on/off state of black pixels within the 5×5 pixel area centered on the black pixel of interest, each logical expression including one or more logical operations applied to the determined on/off state of two or more of the black pixels within the 5×5 pixel area centered on the black pixel of interest, wherein the logical expressions provide a determination of a plurality of black bitmap pixel depth conditions within the 5×5 pixel area, each depth condition including a first black bitmap pixel bordering the black pixel of interest and a second black bitmap pixel bordering the first black bitmap pixel; and
    f) if the black pixel of interest is a natural extension of a halftone pattern associated with the halftone pixel bitmap, the black pixel of interest is associated with an edge, and one or more of the plurality of logical expressions is satisfied, modifying the non-black halftone pixel bitmap at the black pixel of interest location to turn the respective pixel on, thereby providing a natural extension of the halftone pattern associated with the non-black halftone pixel bitmap.

2. The method according to claim 1, wherein steps a)-f) are performed for all qualified black pixels associated with the black pixel bitmap.

3. The method according to claim 1, wherein the size of the predetermined window of pixels is equal to or greater than a halftone cell associated with the non-black halftone pixel bitmap.

4. The method according to claim 1, wherein step b) estimates the continuous tone value associated with black pixels by determining a maximum threshold associated with black pixels within the predetermined window and assigning the determined maximum threshold as the estimated continuous tone value.

5. The method according to claim 1, wherein step c) evaluates a variance of the estimated continuous tone values to determine if the black pixel of interest is associated with an edge.

6. The method of performing black trapping according to claim 1, further comprising:
    receiving a continuous tone data representation of a color image; and
    generating the halftone pixel bitmap representing the color image, the halftone pixel bitmap including a black pixel bitmap plane and one or more non-black halftone pixel bitmap planes.

7. A printing apparatus comprising:
    an image marking device for rendering a color image on a media substrate; and
    a controller configured to receive a halftone pixel bitmap representation of an image for rendering on the image marking device, the controller configured to execute instructions to perform a method of black trapping, the method comprising:
    receiving a halftone pixel bitmap representing the color image, the halftone pixel bitmap including a black pixel bitmap and one or more non-black halftone pixel bitmaps;
        a) determining if a black pixel of interest location associated with the black pixel bitmap is a pixel location associated with a natural extension of a halftone pattern associated with a non-black halftone pixel bitmap;
        b) estimating a continuous tone value associated with one or more black pixels within a predetermined window of pixels associated with the black pixel of interest location;
        c) determining if the black pixel of interest location is associated with an edge based on the continuous tone values associated with the one or more black pixels estimated in step b);
        d) determining an on/off state of black pixels within a 5×5 pixel area centered on the black pixel of interest;
        e) evaluating a plurality of logical expressions associated with the determined on/off state of black pixels within the 5×5 pixel area centered on the black pixel of interest, each logical expression including one or more logical operations applied to the determined on/off state of two or more of the black pixels within the 5×5 pixel area centered on the black pixel of interest, wherein the logical expressions provide a determination of a plurality of black bitmap pixel depth conditions within the 5×5 pixel area, each depth condition including a first black bitmap pixel bordering the black pixel of interest and a second black bitmap pixel bordering the first black bitmap pixel; and f) if the black pixel of interest is a natural extension of a halftone pattern associated with the halftone pixel bitmap, the black pixel of interest is associated with an edge, and one or more of the plurality of logical expressions is satisfied, modifying the non-black halftone pixel bitmap at the black pixel of interest location to turn the respective pixel on, thereby providing a natural extension of the halftone pattern associated with the non-black halftone pixel bitmap.

8. The printing apparatus according to claim 7, wherein steps a)-f) are performed for all pixels associated with the halftone pixel bitmap.

9. The printing apparatus according to claim 7, wherein the size of the predetermined window of pixels is equal to or greater than a halftone cell associated with the non-black halftone pixel bitmap received.

10. The printing apparatus according to claim 7, wherein step b) estimates the continuous tone value associated with black pixels by determining a maximum threshold associated with black pixels within the predetermined window and assigning the determined maximum threshold as the estimated continuous tone value.

11. The printing apparatus according to claim 7, wherein step c) evaluates a variance of the estimated continuous tone values to determine if the black pixel of interest is associated with an edge.

12. The printing apparatus according to claim 7, the controller configured to execute instructions to perform the method of black trapping further comprising:
receiving a continuous tone data representation of a color image; and
generating the halftone pixel bitmap representing the color image, the halftone pixel bitmap including a black pixel bitmap plane and one or more non-black halftone pixel bitmap planes.

13. A method of performing black trapping on a color image data representation for rendering comprising:
a) receiving a halftone pixel bitmap representing the color image, the halftone pixel bitmap including a black pixel bitmap and one or more colorant halftone pixel bitmap;
b) selecting a black pixel of interest associated with the black pixel bitmap;
c) determining if the black pixel of interest location is a pixel location associated with a natural extension of a halftone pattern associated with the colorant halftone pixel bitmap;
d) determining if the black pixel of interest location is associated with an edge;
e) determining an on/off state of black pixels within a 5×5 pixel area centered on the black pixel of interest;
f) evaluating a plurality of logical expressions associated with the determined on/off state of black pixels within the 5×5 pixel area centered on the black pixel of interest, each logical expression including one or more logical operations applied to the determined on/off state of two or more of the black pixels within the 5×5 pixel area centered on the black pixel of interest, wherein the logical expressions provide a determination of a plurality of black bitmap pixel depth conditions within the 5×5 pixel area, each depth condition including a first black bitmap pixel bordering the black pixel of interest and a second black bitmap pixel bordering the first black bitmap pixel; and
g) if the black pixel of interest is a natural extension of a halftone pattern associated with the halftone pixel bitmap, the black pixel of interest is associated with an edge, and one or more of the plurality of logical expressions is satisfied, modifying the non-black halftone pixel bitmap at the black pixel of interest location to turn the respective pixel on, thereby providing a natural extension of the halftone pattern associated with the non-black halftone pixel bitmap.

14. The method according to claim 13, wherein steps a)-g) are performed for all pixels associated with the halftone pixel bitmap.

15. The method according to claim 13, wherein step d) estimates a continuous tone value associated with one or more black pixels by determining a maximum threshold associated with black pixels within a predetermined window and assigning the determined maximum threshold as the estimated continuous tone value, and determining if the black pixel of interest is associated with an edge based on the continuous tone values estimated.

16. The method of performing black trapping according to claim 13, further comprising:
receiving a continuous tone data representation of a color image; and
generating the halftone pixel bitmap representing the color image, the halftone pixel bitmap including a black pixel bitmap plane and one or more non-black halftone pixel bitmap planes.

17. A printing apparatus comprising:
an image marking device for rendering a color image on a media substrate; and
a controller configured to receive a halftone representation of an image for rendering on the image marking device, the controller configured to execute instructions to perform a method of black trapping on the halftone representation of the image, the method comprising:
a) receiving a halftone pixel bitmap representing the color image, the halftone pixel bitmap including a black pixel bitmap and a one or more colorant halftone pixel bitmap;
b) selecting a black pixel of interest associated with the black pixel bitmap;
c) determining if the black pixel of interest location is a pixel location associated with a natural extension of a halftone pattern associated with the colorant halftone pixel bitmap;
d) determining if the black pixel of interest location is associated with an edge;
e) determining an on/off state of black pixels within a 5×5 pixel area centered on the black pixel of interest;
f) evaluating a plurality of logical expressions associated with the determined on/off state of black pixels within the 5×5 pixel area centered on the black pixel of interest, each logical expression including one or more logical operations applied to the determined on/off state of two or more of the black pixels within the 5×5 pixel area centered on the black pixel of interest, wherein the logical expressions provide a determination of a plurality of black bitmap pixel depth conditions within the 5×5 pixel area, each depth condition including a first black bitmap pixel bordering the black pixel of interest and a second black bitmap pixel bordering the first black bitmap pixel; and
g) if the black pixel of interest is a natural extension of a halftone pattern associated with the halftone pixel bitmap, the black pixel of interest is associated with an edge, and one or more of the plurality of logical expressions is satisfied, modifying the non-black halftone pixel bitmap at the black pixel of interest location to turn the respective pixel on, thereby providing a natural extension of the halftone pattern associated with the non-black halftone pixel bitmap.

18. The printing apparatus according to claim 17, wherein steps a)-g) are performed for all pixels associated with the halftone pixel bitmap.

19. The printing apparatus according to claim 18, wherein step d) estimates a continuous tone value associated with one or more black pixels by determining a maximum threshold associated with black pixels within a predetermined window and assigning the determined maximum threshold as the estimated continuous tone value, and determining if the black pixel of interest is associated with an edge based on the continuous tone values estimated.

20. The printing apparatus according to claim 18, the controller configured to execute instructions to perform a method of black trapping further comprising:
    receiving a continuous tone data representation of a color image; and
    generating the halftone pixel bitmap representing the color image, the halftone pixel bitmap including a black pixel bitmap plane and one or more non-black halftone pixel bitmap planes.

* * * * *